United States Patent [19]

Slathar et al.

[11] 3,981,394
[45] Sept. 21, 1976

[54] FEEDING AND ASSEMBLY APPARATUS

[75] Inventors: Donald A. Slathar, Chanhassen; Christiaan H. Neutkens, Cottage Grove, both of Minn.

[73] Assignee: International Telephone and Telegraph Corporation, Nutley, N.J.

[22] Filed: June 3, 1975

[21] Appl. No.: 583,390

[52] U.S. Cl. ............................... 198/391; 198/420; 198/429; 53/154; 53/237
[51] Int. Cl.² ........................................ B65G 47/14
[58] Field of Search ................ 198/26, 29, 30, 249, 198/251, 252, 273, 276, 277, 287–289, 254–256, 220 BA, 32; 221/93, 156, 157, 159, 161; 53/154–156, 160, 237, 238

[56] References Cited
UNITED STATES PATENTS

| | | | |
|---|---|---|---|
| 2,604,624 | 7/1952 | Cutler et al. | 198/256 |
| 3,105,587 | 10/1963 | Boesch | 198/32 |
| 3,301,378 | 1/1967 | Wayne et al. | 198/276 |
| 3,486,511 | 12/1969 | Salvesen | 221/159 |
| 3,517,797 | 6/1970 | Daleffe et al. | 198/287 |

FOREIGN PATENTS OR APPLICATIONS

| | | | |
|---|---|---|---|
| 1,155,382 | 5/1961 | Germany | 198/256 |
| 1,223,740 | 11/1963 | Germany | 53/155 |
| 1,090,737 | 11/1967 | United Kingdom | 198/252 |

*Primary Examiner*—John J. Love
*Assistant Examiner*—Joseph E. Valenza
*Attorney, Agent, or Firm*—John T. O'Halloran

[57] ABSTRACT

Apparatus is described for feeding different type items which are assembled for packaging as a single unit. A plurality of machines comprise the apparatus and each machine deposits items of one type in a row on a conveyor. The items are automatically fed from a trough in the machine and conveyed forward to the depositing position by vibrating V-grooved members. The members are designed to convey only items which are lined-up lengthwise and the thus aligned items are conveyed to a depositing means which properly positions the items in a given row across the conveyor.

7 Claims, 4 Drawing Figures

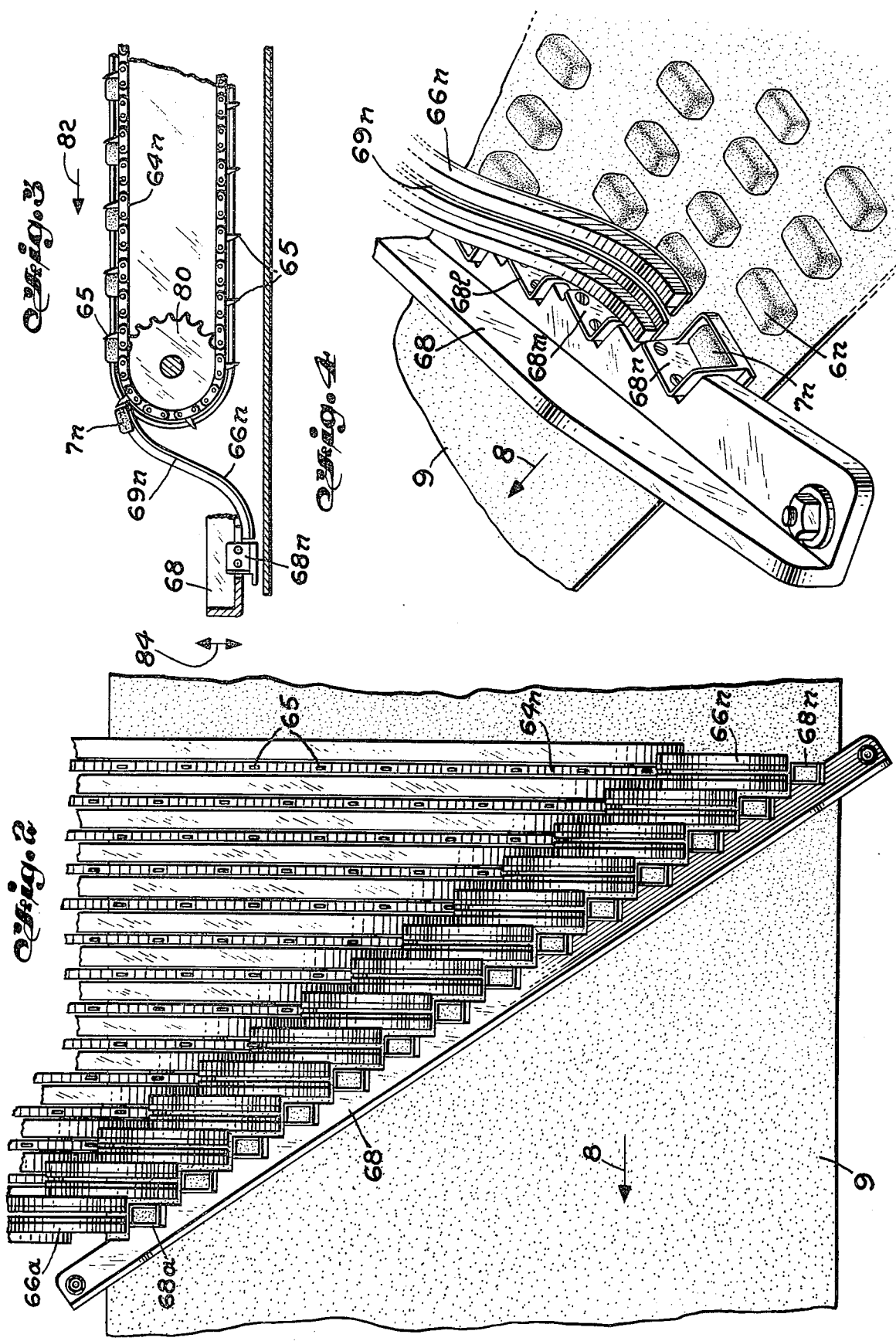

FEEDING AND ASSEMBLY APPARATUS

BACKGROUND OF THE INVENTION

In general, this invention relates to feeding and assembly apparatus and, more particularly, to a machine in which items are predeterminately positioned and deposited in a row.

Feeding and assembly apparatus as is known from the prior art does not have the ability to automatically feed, align and position different type items to be packaged together without excessive amounts of human intervention to feed, align and check the product. For example, many candy bars are produced with a plurality of different components forming a single unitary bar, or with the plurality of different components packaged in a unitary wrapping. The machine must deposit one item in each of a plurality of rows so that an assembly may be made of the different items included in the single package. According to the prior art, processing a candy bar having a number of different component parts was accomplished by a plurality of stations with a number of hand operations in which each operator would deposit one of the plurality of items in a row and each station operator would be responsible for insuring that each assembly in each row included a different item from the associated station. In a conveying system which can handle a multitude of rows at one time, the use of many operators is a costly and uneconomical method of producing such a candy bar or similar type product. Therefore, it was necessary to accomplish at least the automatic feeding and assembly of multi-item candy bars, since the escalating costs of ingredients and labor combined to make the price prohibitive. These and other problems were solved by apparatus of the following invention.

SUMMARY OF THE INVENTION

It is therefore an object of the invention to provide automatic feeding and assembly apparatus.

Another object of the invention is to provide apparatus for feeding and assembling a multi-item candy bar.

A still further object of the invention is to provide apparatus which is able to feed and orient items for incorporation into a single package unit.

According to the broader aspects of the invention, there is provided apparatus having means for feeding and delivering items to be assembled in a predetermined orientation, and means for receiving and for depositing the oriented items in a plurality of rows in a continuous timed manner.

A feature of the invention is that means are provided for delivering items to be packaged onto vibrating V-grooved members, so that only items lined-up along their major axis will continue to move forward by means of the vibrating members, and means positioned forward of said vibrating members deposit the items in a row in predetermined locations.

Another feature of the invention is that the apparatus comprises a plurality of feeding and assembly machines which are positioned along a conveying line, each machine depositing a row of similar items on the conveyor so that the number of machines corresponds to the number of items forming the assembly to be made.

A still further feature of the invention is that this apparatus is particularly adapted to assembling multi-item candy bars and the like, each item having a similarly shaped configuration and adapted to be either enrobed by a coating or packaged as a single unit.

BRIEF DESCRIPTION OF THE DRAWINGS

The foregoing and other objects and additional features of the invention will be more fully understood and appreciated upon consideration of the following detailed description of apparatus organized in accordance therewith, the description being intended to be read in conjunction with the accompanying drawings, in which:

FIG. 2 is a partial top view of the foremost portion of one machine of the apparatus;

FIG. 3 is a partial view of a line of the machine shown in FIG. 2; and

FIG. 4 is an enlarged detail of the reciprocating bar and catcher means of the machine.

DESCRIPTION OF THE PREFERRED EMBODIMENT

Figure 1:
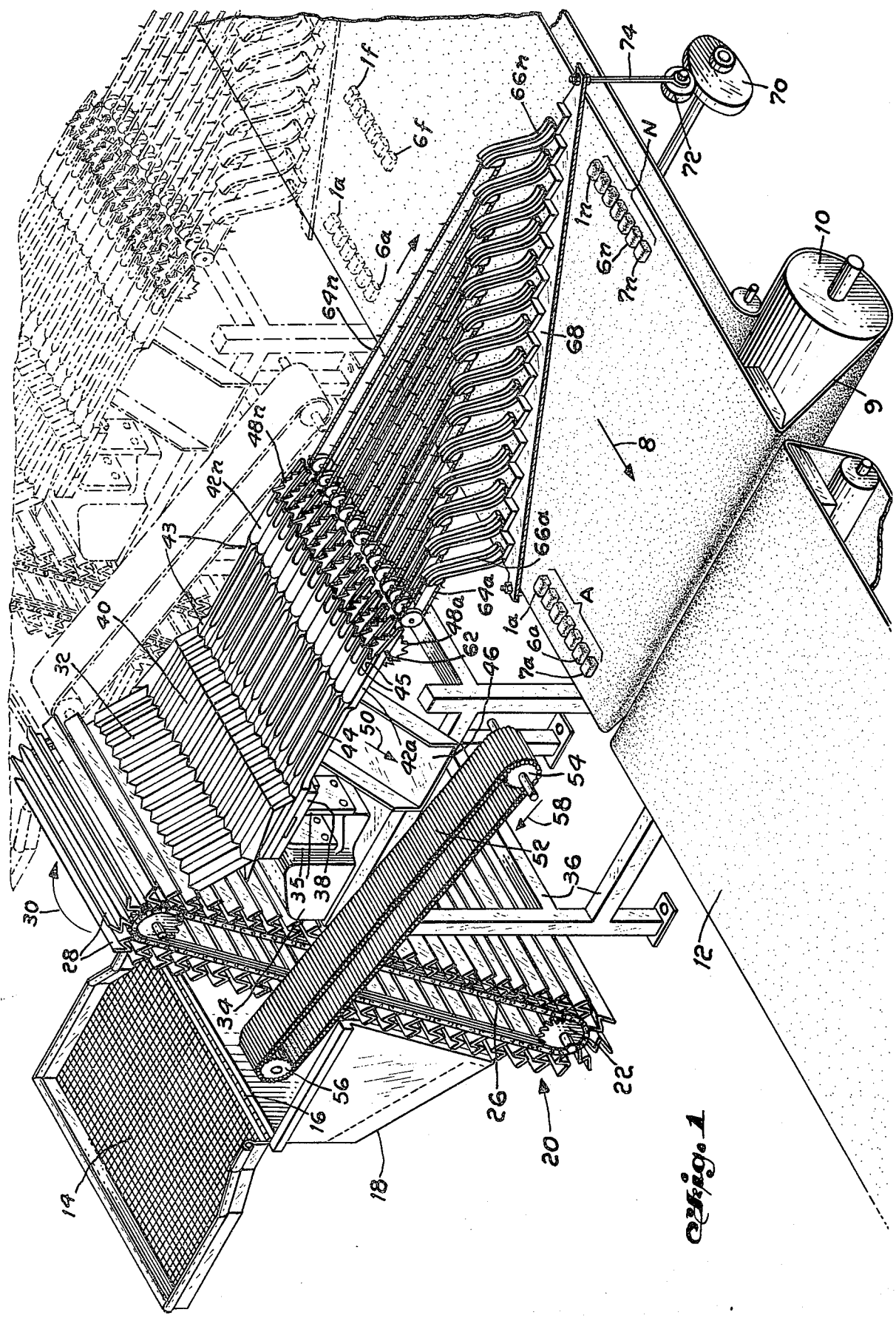
FIG. 1 is an isometric drawing showing the feeding and assembly apparatus according to the invention.

The apparatus of the invention comprises a plurality of machines as shown in FIG. 1 in solid lines. The apparatus is particularly organized for feeding and assembling of different items of candy which are to be enrobed together in chocolate or assembled together in a single package. Each of the items to be assembled is different and each machine, as shown in solid lines, will deposit a row of one type as shown. The machines are positioned along the assembly line. A partial showing of another identical machine is indicated in dash lines for depositing another row of candy of a different type so that an assembly of the items may be made. The number of machines in a row vary according to the number of items to be assembled as a unit. One such candy bar requiring this type assembly is manufactured by the Pearson Candy Company of St. Paul, Minn., which produces a milk chocolate candy bar under the registered trademark "Seven UP", as a licensee of the Seven-Up Company, St. Louis. Mo. This candy bar is made up of seven individual and different confectionary items, i.e. mint, nougat, butterscotch, fudge, coconut, butter cream and caramel. The items are assembled and enrobed in chocolate and packaged. Therefore, the feeding and assembly apparatus to produce this particular bar requires seven machines of the type as shown in FIG. 1 in solid lines, and they would be positioned in a straight line along the length of a moving conveyor.

In general, for each machine, one type item is placed on a hinged tray and after a visual inspection, it is deposited into a trough. An elevator arrangement lifts the items out of the trough and drops an excessive amount of the product on a stationary corrugated chute which by gravity delivers the items onto a shaped vibrator arrangement. The product proceeds and is moved along by vibrating V-grooved members. The members are designed so that the pieces are lined-up lengthwise along their major axis and continue to move towards engaging wheels. The pieces which are not aligned along their major axis will drop between the spaces provided between individual V-grooved members and returned to the trough. All seven machines are coupled and driven from a common drive shaft to provide the synchronization, thus delivering one row of items just ahead of the oncoming row until a complete seven item candy bar is assembled and delivered to the enrobing station.

Referring specifically now to FIG. 1, a detailed description of the operation of the apparatus and the machine shown in solid lines will be described. The apparatus enables the assembling of fourteen candy bars A through N, each bar comprising seven items, i.e. $1a$ to $7a$, and moving in the direction of arrow 8 on a conveyor 9 which is driven by drive roller 10 in a continuous loop. The output conveyor 12 is also driven and carries the assemblies A to N to an enrobing or wrapping station. Each assembly of items comprises a plurality of substantially rectangular items as shown. The row $7a - 7n$ in each line moving in direction 8 is deposited by the machine shown in solid lines, and the row $6a - 6n$ is deposited by the previous in line machine partially shown in dash lines. Only one machine is shown in solid lines for simplicity, since all seven machines in the line would be identical. The output conveyor 12 receives fourteen lines with each line having seven individual and different items of candy which are grouped as illustrated, In describing the operation of the apparatus of the invention, it should be understood that all of the driving and coupling pulleys have not been shown to simplify the drawings, it being understood that one ordinarily skilled in the art can provide the coupling necessary for driving the conveyors, pulleys, and wheels of the machine from a common drive once the essential features are understood by reference to the disclosure. The items 7 for the machine shown in solid lines are deposited on a hinged screen tray 14 which is hingedly attached at 16 to a trough 18. The items that are deposited on the screen tray are visually inspected and any broken and unsatisfactory pieces removed. The loose and broken items fall through the screen and are caught in a waste disposal means not shown. The items are then displaced into the trough 18 tilting the hinged screen tray towards the trough. The elevator arrangement 20 is provided for engaging the individual items from the trough. The elevator arrangement includes a lower pair of sprocket wheels 22 (only one shown), and an upper pair of sprocket wheels 24 (only one shown) which engages a chain link 26 on which is mounted a plurality of Z-shaped catching members 28 moving in the direction of arrow 30. Each member 28 engages a plurality of items 7 and drops them onto a stationary corrugated chute 32 which by gravity delivers the items 7 onto a V-grooved vibrating means 40. A vibrator 34 mounted on the frame 36 has elements 35 which extend and support mounting plate 38 on which is mounted the vibrating means 40 and vibrating V-grooved members $42a - 42n$. The vibrator 34 may be of the type as supplied by Syntron, Type BF-01-C Feeder, Homer City, Pa.

Each of the V-grooved members 42 have a necked-down portion 43 providing an intermediate space 44 between adjacent members. This space enables items that are not lined-up lengthwise, i.e. along the major axis of the substantially rectangular shape, to drop by gravity through the spaces 44 and onto a return chute 46. The returned items are those pieces which were not lined-up lengthwise and moving forward along the V-grooves toward the engaging wheels $48a - 48n$. The items which are not properly aligned drop onto the return chute 46 and move in the direction of arrow 50 onto an inclined wire belt 52 which is mounted about driven pulleys 54, 56 for returning the unaligned items in the direction of arrow 58 to the trough 18. Another return chute may be positioned adjacent pulley 53 to guide the returned items into the trough if required. The guide rails along the belt 52 are not shown for purposes of clarity in the drawing.

The arrangement of the V-grooved members with the necked-down portion insures the forward movement of the items in a lined-up lengthwise condition so that they are properly delivered in a uniform manner to the groupings. The foremost end 45 of the vibrating members 42 are fork-shaped and mounted therein by shaft 60 are the engaging wheels 48. Wheels 48 for all machines are driven from the common timing drive means to deliver the items to a lug chain bed $64a - 64n$ of varying length so as to span across the width of the conveyor 9. The lug chain bed to be more specifically described in connection with FIGS. 2 and 3. However, it should be realized that the span length of each lug chain bed 64 will correspond to the span required by the number of lines and the width of the conveying belt 9.

Each lug chain bed $64a - 64n$ is terminated by a corresponding drop chute $66a - 66n$. The drop chute delivers by gravity the items into a reciprocating timing bar and catcher means 68. The timing bar and catcher means moves up and down in predetermined time relationship by means of a driven cam 70 and cam follower 72 which operatively moves by coupling 74 the timing bar and catcher 68 up and down. All the reciprocating timing bars and catchers are coupled to a common drive shaft and have similarly shaped cams which are operated in unison to deliver one row of product just ahead of an oncoming row until a complete unit has been assembled.

Referring now to FIG. 2, a partial top view of the forward portion of the machine of FIG. 1 is illustrated. Above the conveyor 9 moving in the direction of arrow 8 is the reciprocating timing bar and catcher 68 which is positioned on an oblique angle with respect to the conveyor 9. The means 68 comprises a bar with individual item catchers $68a$ through $68n$ having a rectangular shell into which the items are dropped. Positioned to drop the items are slotted drop chutes $66a$ through $66n$. Feeding each drop chute is a corresponding lug chain $64a - 64n$ which delivers the items to individual ones of the chutes $66a - 66n$. Each of the lug chain bed lines 64 has a length proportional to the distance to catcher $68a - 68n$ to deliver an item for depositing in the corresponding line of the row.

Referring now to FIG. 3, an end view is illustrated showing the chain lug $64n$. The chain lug is mounted about sprocket wheels; one sprocket chain drive wheel 80 is shown for driving the lug chain $64n$ having a plurality of lugs 65 in the direction of arrow 82 to chute $66n$ to displace one of the items $7n$ into the associated catcher $68n$. The catcher $68n$ is moving with bar 68 in the direction of arrow 84 which is up and down in accordance with the shape of the cam means 70. Wheel 80 is driven from a common drive means as cam 70 so that the speed of the chain link 64 is in predetermined timed relationship with the up and down motion of catcher $68n$. Accordingly, an individual item $7n$ is delivered and slides into the associated catcher $68n$ when the bar 68 is in its lower position or closest to the conveying belt 9 as is illustrated in FIG. 4.

Referring now to FIG. 4, the partial enlarged detailed view shows chute $66n$ formed in two sections with a space $69n$ down the center of the chute to enable the lugs 82 to pass therebetween as shown in FIG. 3. The item $7n$ is shown displaced in catcher $68n$ which is positioned just ahead of item 6n supplied by the previous machine. Since the conveyor and drives for the machines are coupled to a common drive source, the relative speed and placement of the items into its associated catcher in a given row is easily accomplished.

The foregoing detailed description describes the feeding and assembly apparatus in connection with a specific isometric drawing and partial details of one of the machines to illustrate how this unique combination is used to feed and assemble individual items in a plurality of lines, each item in each row being different and supplied by a different machine in a line of machines corresponding to the number of different items in any given group. The apparatus is flexible to enable a number of lines according to the width of the conveyor.

Reviewing briefly the operation, individual items which for the instant embodiment are rectangular candy items to be assembled in a single candy bar by enrobing with chocolate are deposited into a trough. An elevator arrangement feeds the items out of the trough and drops them on a stationary corrugated chute which by gravity delivers the items onto a vibrating means. The vibrating means comprises V-grooved members having a necked-down portion; the members are designed to convey the product forward due to the vibrator motion along the major axis of the item. The necked-down portion enables any item which is not lined-up lengthwise along the V-groove to fall between the spaces provided between adjacent members. The unaligned items drop onto a return chute and conveyor means returns them to the trough. The items are conveyed forward on an edge along their major axis and delivered by the vibrating V-grooved members and are engaged by engaging wheels. The wheels deposit the items on a lug chain bed. One item for each lug in the chain is delivered to a drop chute. The drop chutes are positioned to slide the item into a reciprocating catcher which positions the item forward of the oncoming rows. Thereby, one row of the type item is placed across the width of the conveyor just ahead of the oncoming rows until a complete seven item candy bar is assembled.

While we have described above the principles of our invention in connection with specific apparatus, it is to be clearly understood that this description is made only by way of example and not as a limitation to the scope of our invention as set forth in the objects thereof and in the accompanying claims.

We claim:

1. In feeding and assembly apparatus, a machine comprising:
    means for feeding a plurality of individual items from a supply;
    vibrating means for receiving said fed items and moving them along their major axis, said vibrating means includes a row of vibrating members, each of said members are V-grooved and have a narrow middle section for providing a space between adjacent members, whereby all items which are unaligned lengthwise along the V-groove drop through the spaces provided between adjacent members;
    means coupled to said vibrating means for engaging said items and depositing them in a row across a conveying means moving transversely to said vibrating means, said means for engaging and depositing include a row of wheels terminating said vibrating means for engaging said items, a chain lug bed for receiving said items from said wheels and depositing them onto a slide chute, and a reciprocating means for positioning the items from the slide chute in said row across the conveying means; and
    means for returning the dropped items to said supply.

2. The machine of claim 1, wherein said feeding means includes elevator means for lifting an excess amount of said items from a trough and depositing them onto a stationary corrugated chute.

3. The machine of claim 2, wherein said chute delivers said items by gravity feed to said vibrating means.

4. Confectionary apparatus comprising in combination:
    means for feeding individual items from a supply position in a plurality of rows;
    a row of vibrating means for receiving said fed items and moving them in said plurality of rows along their major axis;
    means coupled to said vibrating means for engaging said items and depositing them in a row across a conveying means moving transversely to said vibrating means;
    said feeding means includes elevator means for lifting an excess amount of items from a trough and depositing them onto a stationary corrugated chute;
    said vibrating means includes a row of vibrating members, each of said members are V-grooved and have a narrow portion for providing a space between adjacent members;
    a row of wheels terminating said vibrating means for engaging said items;
    a chain lug bed for receiving said items and depositing them onto a row of slide chutes; and
    a reciprocating bar and catcher for locating the items from the slide chutes in a row across the conveying means.

5. A machine comprising:
    means for feeding a plurality of individual items from a supply;
    vibrating means for receiving said fed items and moving them along their major axis, said vibrating means includes a row of vibrating members, each of said members are V-grooved and have a narrow middle section for providing a space between adjacent members, such that all items which are unaligned lengthwise along the V-groove drop through the spaces provided between adjacent members;
    means coupled to said vibrating means for engaging said items and depositing them in a row across a conveying means moving transversely to said vibrating means, means for engaging and depositing include a row of wheels terminating said vibrating means for engaging said items, a chain lug bed for receiving said items from said wheels and depositing them onto a slide chute, and a reciprocating means for positioning the items from the slide chute in said row across the conveying means;
    said reciprocating means include a reciprocating bar and attached row of catchers positioned on an oblique line across the conveyor, whereby said catchers receive and position the items from said row of slide chutes; and
    means for returning the dropped items to said supply.

6. The machine of claim 5, wherein said feeding means includes elevator means for lifting an excess amount of said items from a trough and depositing them onto a stationary corrugated chute.

7. The machine of claim 6, wherein said chute delivers said items by gravity fed to said vibrating means.

* * * * *